(12) United States Patent
Agricola et al.

(10) Patent No.: US 6,830,026 B2
(45) Date of Patent: Dec. 14, 2004

(54) DIAGNOSTICS SYSTEM FOR TRACING LEAKS FROM A GAS-SUPPLY SYSTEM AND FOR CHECKING OPERATION OF THE VALVES FORMING PART OF SAID SYSTEM

(75) Inventors: Ulderico Maria Agricola, Turin (IT); Guido Migliaccio, Turin (IT)

(73) Assignee: C.R.F. Società Consortile Per Azioni, Turin (IT)

( * ) Notice: Subject to any disclaimer, the term of this patent is extended or adjusted under 35 U.S.C. 154(b) by 162 days.

(21) Appl. No.: 10/102,947

(22) Filed: Mar. 22, 2002

(65) Prior Publication Data

US 2002/0134342 A1 Sep. 26, 2002

(30) Foreign Application Priority Data

Mar. 23, 2001 (IT) ..................................... TO2001A0276

(51) Int. Cl.[7] .................................................. F02B 69/04
(52) U.S. Cl. ................... 123/198 D; 123/525; 123/1 A; 123/27 GE
(58) Field of Search ............................. 123/198 D, 1 A, 123/3, 527, 27 GE, 525

(56) References Cited

U.S. PATENT DOCUMENTS

| | | | | |
|---|---|---|---|---|
| 4,411,223 A | * | 10/1983 | Kiely .............................. | 123/3 |
| 5,305,714 A | * | 4/1994 | Sekiguchi et al. .............. | 123/3 |
| 5,462,021 A | * | 10/1995 | Minami et al. ................. | 123/3 |
| 6,044,806 A | * | 4/2000 | Brown et al. ............ | 123/27 GE |
| 6,367,458 B1 | * | 4/2002 | Furusho et al. .......... | 123/198 D |
| 6,390,075 B1 | * | 5/2002 | Yamazaki et al. ........... | 123/529 |
| 6,502,551 B2 | * | 1/2003 | Antonioli et al. ........ | 123/198 D |
| 6,578,560 B2 | * | 6/2003 | Ricco .......................... | 123/527 |

FOREIGN PATENT DOCUMENTS

| | | |
|---|---|---|
| EP | 0 801 223 A1 | 10/1997 |
| JP | 09 242 614 | 9/1997 |
| JP | 2000 303909 | 10/2000 |
| WO | WO 96/10707 | 4/1996 |

* cited by examiner

Primary Examiner—Henry C. Yuen
Assistant Examiner—Jason Benton
(74) Attorney, Agent, or Firm—Sughrue Mion, PLLC

(57) ABSTRACT

In a gas-supply system for supplying a generic engine of a vehicle type, comprising electronic control means for controlling delivery devices associated to various engines, said electronic control means are programmed for processing the data regarding the low-pressure part of the system according to a predetermined algorithm, at predefined instants, in order to enable timely detection of incorrect functioning of a solenoid valve set in a position corresponding to a pressure-reducing device set between the gas tank and a manifold for distribution of the gas to the delivery devices. The system is moreover able to detect possible gas leaks from the low-pressure part of the system. The electronic control means are moreover able to process the data regarding the high-pressure part of the system, according to a predetermined algorithm, during operation of the system in order to enable timely detection of incorrect functioning of the valve set immediately at the outlet of the tank or to detect a possible gas leak from the high-pressure part of the system.

6 Claims, 1 Drawing Sheet

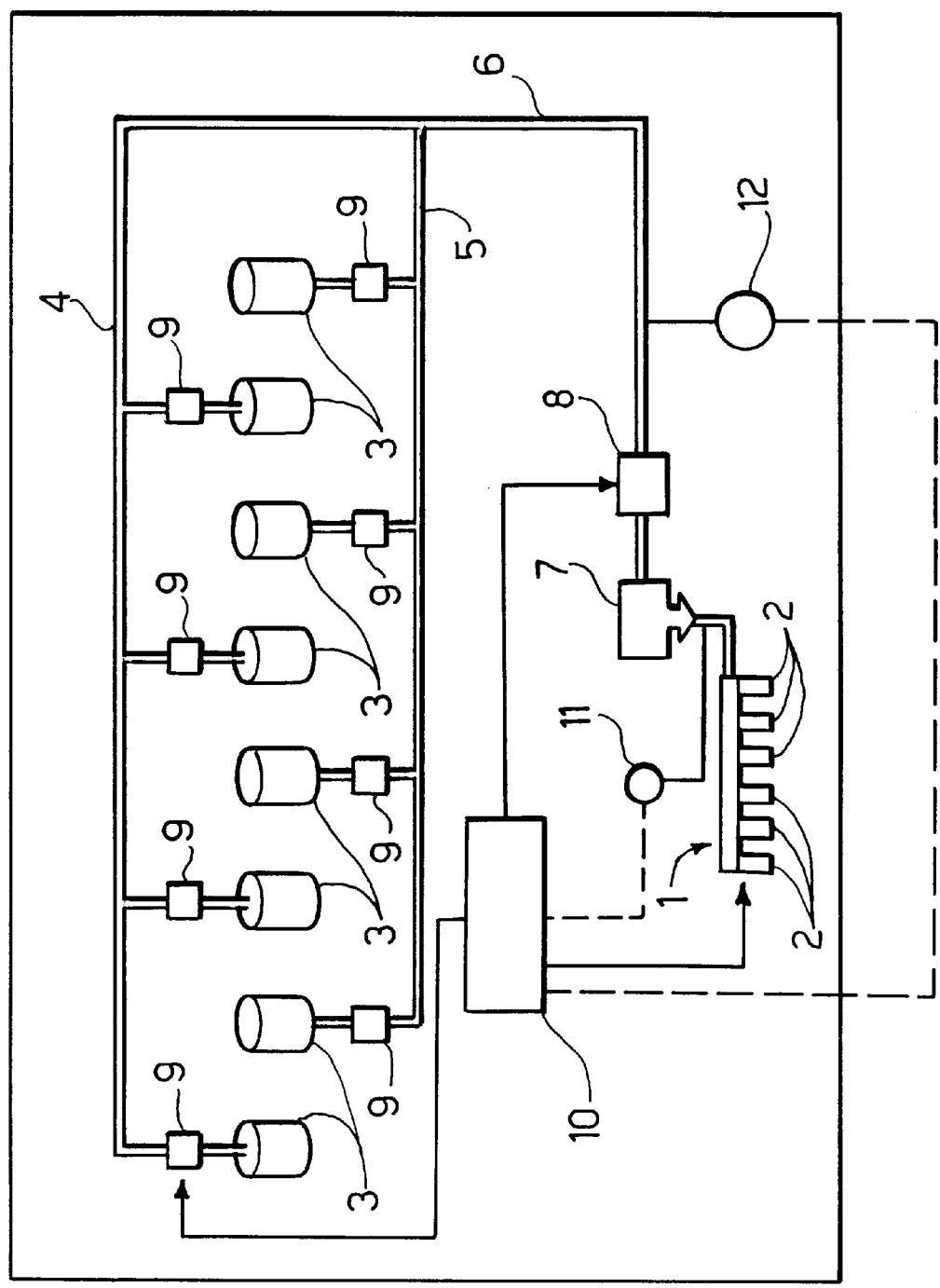

DIAGNOSTICS SYSTEM FOR TRACING LEAKS FROM A GAS-SUPPLY SYSTEM AND FOR CHECKING OPERATION OF THE VALVES FORMING PART OF SAID SYSTEM

BACKGROUND OF THE INVENTION

The present invention relates to fuel systems for supplying gas, for example methane, LPG or hydrogen, to vehicle engines. In particular, the invention relates to fuel systems for supplying gas, of the type comprising:

- at least one tank, in which gas under high pressure is accumulated;
- a manifold for distribution of the gas, which has an inlet connected to the tank and a plurality of outlets connected to the respective delivery devices;
- a pressure-reducer device, set in the connection between the tank and the manifold;
- one or more valves set at the outlet of the gas from one or more tanks and in a position corresponding to the pressure-reducer device;
- first and second sensor means for detecting respectively: pressure of the gas upstream of the pressure-reducer device, i.e., in the high-pressure part of the system, and pressure and temperature of the gas downstream of the pressure-reducer device, i.e., in the low-pressure part of the system; and
- electronic control means capable of regulating the rate of gas flow in the fuel system.

Gas-supply systems of the type referred to above have been known for some time. A system of this type is, for instance, described and illustrated in the European patent No. EPO 801 223 in the name of the present applicant.

SUMMARY OF THE INVENTION

The purpose of the present invention is that of providing a diagnostics system for tracing leaks from a fuel system of the type referred to above and for checking proper operation of the valves of the system.

With a view to achieving the above purpose, the subject of the invention is a gas-supply system of the type referred to above, which is further characterized in that the aforesaid electronic control means are designed for receiving the signals from said first and second sensor means and are programmed for:

- processing the data regarding the low-pressure part of the system, which come from said first sensor means, according to a predetermined algorithm, at predefined instants, in order to enable timely detection of incorrect functioning of said second valve or a possible gas leak from the low-pressure part of the system; and
- processing the data regarding the high-pressure part of the system, which come from said second sensor means, according to a predetermined algorithm, during the step of gas delivery in order to enable timely detection of incorrect functioning of any possible valves referred to previously or a possible gas leak from the high-pressure part of the system.

Of course, the basic idea underlying the present invention already lies in the very problem that the invention solves. Up to the present day, in fact, no systems of any kind capable of performing diagnostics operations of the type referred to above have been proposed. Consequently, even before being identified in the use of a specific algorithm in order to achieve the pre-set purpose, the invention is to be identified in having posed itself the problem of creating a diagnostics system in a gas-supply system of the type specified above.

In the preferred embodiment of the invention, the aforesaid electronic control means are programmed for carrying out a check on the low-pressure part of the system in a first step immediately after the command for cessation of gas delivery, but prior to the actual cessation thereof, in order to enable detection of any possible malfunctioning of the second valve, and in a second step, following upon said cessation of operation, in order to enable detection of any possible gas leaks.

Again in the case of the preferred embodiment of the invention, the aforesaid electronic control means are programmed for carrying out a check on the high-pressure part of the system in a first step, when a condition of minimum delivery is reached for the first time immediately after filling of the gas tank, in order to enable detection of any possible gas leaks, and in a second step, at the first reactivation of the system after filling of the gas tank, in order to enable detection of any possible malfunctioning of the first valves.

Further characteristics and advantages of the present invention will emerge from the ensuing description, with reference to the attached drawing, which is provided purely by way of non-limiting example and which is a schematic illustration of a gas-supply system for the internal-combustion engine of a bus, equipped with an electronic diagnostics system according to the invention.

With reference to the drawing, number 1 designates, as a whole, a manifold for distributing gas to a plurality of injectors 2, associated to the various cylinders of the internal-combustion engine of a bus. The engine is supplied with gas, for instance methane, which is accumulated at high pressure in a plurality of tanks 3. The gas arrives at the manifold 1 from each tank 3 through respective lines 4, 5 which converge in a line 6, which terminates in a pressure-regulating device 7 that is designed to reduce the pressure from the value at which the gas is accumulated in the tanks 3 to the value at which the gas is to be supplied to the distribution manifold 1. Immediately upstream of the pressure-regulating device 7, and possibly integrated therein, is provided a solenoid valve 8, which is illustrated separately for greater clarity. Immediately adjacent to the outlet of each tank 3 there is provided a solenoid valve 9. The part of the circuit set upstream of the solenoid valve 8 constitutes the high-pressure section of the system, whilst the remaining part, set downstream of the solenoid valve 8, constitutes the low-pressure section of the system. According to a technique in itself known, the system further comprises an electronic control unit 10, which controls the injectors 2 and the solenoid valves 8 and 9 and which receives the signals coming from sensors of pressure, temperature and mass consumption of the gas, the said sensors being indicated as a whole by 11 and 12 and being set, respectively, downstream of the pressure-regulating device 7 and upstream of said device, in the high-pressure part of the system. The electronic control unit 10 moreover receives signals 10$a$ coming from one or more sensors (not illustrated) indicating one or more operating parameters of the engine.

Each of the components described above is of a type in itself known. Consequently, in the present description they are not illustrated in greater detail.

According to the invention, the electronic control unit 10 is programmed for carrying out diagnostics on the system in order to detect any possible leaks therein and to check proper operation of the solenoid valves 8 and 9.

In the ensuing description and in the claims, the following symbols are used:

p pressure
T temperature
ρ density of gas
q mass consumption of gas
V volume of system
R constant of the gas contained in the system
HP subscript for high pressure
LP subscript for low pressure
thr subscript for a limit value defined at calibration
Δt generic time interval
x time interval defined at calibration
0 subscript for initial instant
fin subscript for final instant
Nm3 subscript for quantities measured under normal conditions
theor subscript for quantities calculated
c, $V_x$, $W_x$ coefficients defined at calibration
$n_{injectors}$ number of injectors in system
limit subscript for limit-of-admissibility condition
rnd( ) function of rounding off to the nearest integer
$T_r$ maximum leakage admissible for gas injector [see page 11]

Diagnostics Test Carried Out on Low-pressure (LP) Circuit

Described in what follows is the test used for carrying out diagnostics on the low-pressure (LP) circuit.

As already indicated, the diagnostics on the low-pressure circuit involves verification of proper functioning of the solenoid valve 8, which is usually integrated in the pressure-reducing device 7, as well as tracing of any possible leaks from the pipes of the system. In particular, the diagnostics test involves two steps (Step I and Step II).

The sequence of operations is described in what follows.

Step I—Verification of Operation of the Solenoid Valve 8 Integrated in the Reducer Device 7

The following set of operations is carried out immediately after key-off (instant 0) and envisages that the engine will continue to operate for an interval of time that is variable according to the conditions of operation immediately prior to key-off; however, with a top limit for reasons of safety.

In what follows, the symbols that are underlined refer to quantities measured, whilst the ones that are not underlined refer to quantities calculated.

The operations that are to be carried out are the following:

1. Measure $\underline{p}_0$, $\underline{T}_0$ and $q_0$ (indicated by electronic control unit).

2. At each instant i, after $\Delta t_i$, measure $\underline{p}_i$ and update $q_i = \Sigma(j=0,i)\,(q_0\,\Delta t_j)$.

3. When $p_i \leq p_{thr}$, or else if $t_i \geq t_{thr}$ terminate injection/ignition, measure $\underline{p}_{fin}$, $\underline{T}$fin, and calculate the following quantities:

$$m_0 = \underline{p}_0 V_{LP}/(R\underline{T}_0) \quad q_{fin} = \Sigma(j=0,\text{ fin})(q_0 \Delta t_j)$$

$$m_{fin} = m_0 - q_{fin} \quad p_{fin} = m_{fin} V_{LP}/(R\underline{T}_{fin})$$

$$\Delta p_{fin} = \underline{p}_0 - \underline{p}_{fin} \quad \Delta p_{fin} = \underline{p}_0 - p_{fin} \quad S = \Delta p_{fin}/\Delta \underline{p}_{fin}$$

If $S \leq c$, with $c > 1$, it is confirmed that the solenoid valve 8 is operating properly. If $S > c$, the solenoid valve 8 presents malfunctioning.

Step II—Verification of Presence of Leakages from LP System

The following set of operations is carried out upon completion of each turning-off step, i.e., at the end of step I (instant 0) and in the case where the latter step has not revealed any malfunctioning of the solenoid valve 8 integrated in the pressure reducer 7.

The operations that are to be carried out in step II are as follows:

1. Open the solenoid valve integrated in the pressure reducer in order to restore the nominal pressure in the LP system.

2. Measure $\underline{p}_0$ and $\underline{T}_0$.

3. Calculate $\rho_T = \rho_{Nm3}\,p_T\,T_{nm3}/(p_{Nm3}\,T_T)$.

4. At the end of a time interval equal to $\Delta t_{test}$, measure $\underline{p}_{fin}$, $\underline{T}_{fin}$ and calculate the following quantities:

$$m_0 = \underline{p}_0 V_{LP}/(R\underline{T}_0) \quad \Delta m_{lim} = n_{injectors} T_R \rho_T \Delta t_{test}$$

$$m_{fin} = m_0 - \Delta m_{lim}$$

$$p_{fin} = m_{fin} V_{LP}/(R\underline{T}_{fin})$$

$$\Delta \underline{p}_{fin} = \underline{p}_0 - \underline{p}_{fin} \quad \Delta p_{fin} = \underline{p}_0 - p_{fin} \quad S = \Delta p_{fin}/\Delta \underline{p}_{fin}$$

5. If $S < 1$, leakages are present in the system.

Diagnostics Test on High-pressure (HP) Circuit

Described in what follows is the diagnostics test on the high-pressure circuit. The said test involves verification, with the engine started, of any possible leaks from the pipes of the fuel system (Step I) and of any possible malfunctioning of the individual solenoid valves 9 applied on the gas cylinders (Step II).

Step I—Verification of Leakages from Pipes of HP System

This step is carried out when the minimum engine r.p.m. is reached for the first time immediately after filling the gas tank (which is identified following an appropriate strategy).

The operations to be carried out are as follows:

1. Engine at minimum r.p.m.

2. Carry out the operations listed below only if $p_{HP} > P_{thr}$.

3. At the initial instant, close all solenoid valves on the gas cylinders (instant 0).

4. Measure pressure p on HP part ($p_{HP\,0}$).

5. At each instant X calculate, using an appropriate algorithm, the $\Delta p_{theor}$ that should be found in the time interval $t_x - t_0$ in the absence of leakages, considering the effective consumption in said interval.

6. Repeat steps 4 and 5 until $\Delta p_{theor} \geq \Delta p_{thr}$.

7. Measure pressure ($p_{HP}$) again.

8. Calculate pressure difference $\Delta p = p_{HP\,0} - p_{HP}$.

9. Calculate the ratio S between $\Delta p_{theor}$ and $\Delta p$.

10. If S is lower than a threshold $V_x$, then signal a leak in the circuit; if S is higher than another threshold value $W_x$, then signal that one of the solenoid valves integrated in the gas cylinders is not closing properly.

Step II—Verification of State of System Solenoid Valve

This step of the test is carried out prior to setting the vehicle in motion, with the engine running, immediately after the filling step (identified by means of an appropriate strategy).

In particular, the diagnostics in this step is based upon the calculation of n parameters $S_i$ (n=number of gas cylinders of system), upon analysis of the numerical value assumed by the parameters $S_i$, and upon the comparison between the two.

The operations to be carried out are as follows:
1. Engine operating in stationary or transient conditions.
2. Carry out test only if $p_{HP} > p_{thr}$.
3. Close all solenoid valves on gas cylinders, except for solenoid valve No. 1 (instant 0).
4. Measure pressure $p_1$ on HP part ($p_{1\ HP\ 0}$).
5. At each instant Y calculate, using an appropriate algorithm, the $\Delta p_{1\ theor}$ that should be found in the time interval $t_Y - t_0$ in the absence of leakages, considering the effective consumption in said interval ($q_{Y-0}$).
6. Repeat steps 4 and 5 until $\Delta p_{1\ theor} \geq \Delta p_{1\ thr}$.
7. Measure pressure ($p_{1\ HP}$) again.
8. Calculate $\Delta p_{1\ eff} = p_{1\ HP\ 0} - p_{1\ HP}$.
9. Calculate the ratio $S_1$ between $\Delta p_{1\ theor}$ and $\Delta p_{1\ eff}$
10. Repeat steps 2 to 9 a further n−1 times, alternately leaving the other n−1 solenoid valves open.
11. Analyse the $S_i$ values thus obtained and compare them with one another following the criteria specified below:
If $1-\eta < S_i < 1+\eta$, for i=1 . . . n, then no leakage is present and the solenoid valves are working properly. If the above condition is not verified, proceed as described below:
If $S_{i+1} - v < S_i < S_{i+1} + v$, for i=1 . . . n−1, AND $S_i < 1-v$, for i=1 . . . n, then there is a leakage in the circuit.
If for some instants i it is found that $S_i < e$ and, at the same time, for all the other instants i it is found that $1-\eta < S_i < 1+\eta$, then the solenoid valves for which the first condition applies remain closed.
If $S_i < 1-\eta$ for each instant i, and for some instants i it is found that ($S_i < S_{i-1} - v$ OR $S_i < S_{i+1} - v$), then there are leakages in the circuit and moreover the solenoid valves for which the second condition applies are not functioning properly.
$\eta, \mu, v$ are thresholds that can be calibrated.
If for some instants i it is found that (rnd($S_i$)=rnd($S_{i+1}$)−1, or else (rnd($S_i$)=rnd($S_{i-1}$)−1), then there is a malfunctioning in the i-th solenoid valve. Given m solenoid valves that present malfunctioning, the solenoid valves for which it is found that rnd($S_i$)=m leak, whilst the others remain closed.

From the foregoing description it is evident that the system according to the invention is able to carry out, in an altogether automatic way, diagnostics of leakages in the gas system and verification of the operation of the system solenoid valves.

What is claimed is:

1. A gas-supply system of the type comprising:
   at least one tank, in which gas under high pressure is accumulated;
   a manifold for distribution of the gas, which has an inlet connected to the tank and a plurality of outlets connected to respective delivery devices;
   a pressure-reducer device set in the connection between the tank and the manifold;
   one first valve and one second valve set respectively at the outlet of the gas from the tank and in a position corresponding to the pressure-reducer device;
   first and second sensor means for detecting pressure, temperature and mass consumption of the gas, set respectively downstream of the pressure-reducer device, i.e., in the low-pressure part of the system, and upstream of the pressure-reducer device, i.e., in the high-pressure part of the system; and
   electronic control means for controlling the delivery devices according to a plurality of signals sent thereto, which indicate the conditions of operation of the system,
   wherein said electronic control means are set for receiving the signals from said first and second sensor means and are programmed for:
   processing the data regarding the low-pressure part of the system, which come from said first sensor means, according to a predetermined algorithm, immediately after each command for cessation of gas delivery, in order to enable timely detection of incorrect functioning of said second valve or a possible gas leak from the low-pressure part of the system; and
   processing the data regarding the high-pressure
   part of the system, which come from said second sensor means, according to a predetermined algorithm, during operation of the system, in order to enable timely detection of incorrect functioning of said first pressure part of the system,
   wherein the aforesaid electronic control means are programmed for carrying out a check on the low-pressure part of the system in a first step immediately after the command for cessation of gas delivery, but prior to the actual cessation thereof, in order to enable detection of any possible malfunctioning of the second valve, and in a second step, following upon said cessation of operation, in order to enable detection of any possible gas leaks.

2. The system according to claim 1, wherein, in said first step, the aforesaid electronic control means are programmed for executing the following operations:
   a) measuring the values $p_0$, $T_0$, $q_0$ signalled by said first sensor means at an initial instant $i_0$;
   b) at each subsequent instant i, after a time $\Delta t_1$, measuring $p_i$ and updating $q_i = \Sigma(j=0, i)(q_0 \Delta t_j)$;
   c) when the value $p_i$ measured becomes equal to or lower than a pre-determined threshold value $p_{thr}$, or else after a pre-set time x, measuring $p_{fin}$, $T_{fin}$, and calculating the following quantities:

$$m_0 = p_0 V_{LP}/(RT_0) q_{fin} = \Sigma(j=0, \text{fin})(q_0 \Delta t_{fin})$$

$$m_{fin} = m_0 - q_{fin} p_{fin} = m_{fin} V_{LP}/(RT_{fin})$$

$$\Delta p_{fin} = p_0 - p_{fin} \Delta p_{fin} = p_0 - p_{fin}$$

$$S = \Delta p_{fin}/\Delta P_{fin}$$

where $V_{LP}$ is the volume of the low-pressure part of the system;
   d) comparing the value of the parameter S thus calculated with a coefficient c>1 defined in the calibration of the system, the condition being an index of proper operation of the second valve; and
   e) generating a warning signal, should the aforesaid condition of proper operation not be met.

3. The System According to claim 1, wherein, in said second step, the aforesaid electronic control means are programmed for executing the following operations:
   a) opening said second solenoid valve to restore the nominal pressure in the low-pressure part of the system;
   b) measuring the values $p_0$, $T_0$ signalled by said second sensor means at an initial instant $i_0$;
   c) calculating $\rho_T = \rho_{Nm3} p_T T_{Nm3}/(p_{Nm3} T_T)$
where $\rho_T$ and $\rho_{Nm3}$ are the values of the gas density respectively at the temperature T and pressure $p_T$ and in normal conditions, corresponding to the temperature $T_{nm3}$ and pressure $p_{Nm3}$;

d) at the end of a time interval equal to $\Delta t_{test}$, measure $p_{fin}$, $T_{fin}$ and calculate the following quantities:

$$m_0 = p_0 V_{LP}/(RT_0)$$

$$\Delta m_{lim} = n_{injectors} T_R \rho_T \Delta t_{test} \quad m_{fin} = m_0 - \Delta m_{lim}$$

$$p_{fin} = m_{fin} V_{LP}/(RT_{fin})$$

$$\Delta p_{fin} = p_0 - p_{fin} \quad \Delta p_{fin} = p_0 - p_{fin}$$

$$S = \Delta p_{fin}/\Delta p_{fin},$$

the condition S<1 being an index of leakages in the system; and e) generating a warning signal, should the aforesaid condition that is an index of leakages be verified.

4. A gas-supply system of the type comprising:

at least one tank, in which gas under high pressure is accumulated;

a manifold for distribution of the gas, which has an inlet connected to the tank and a plurality of outlets connected to respective delivery devices;

a pressure-reducer device set in the connection between the tank and the manifold;

one first valve and one second valve set respectively at the outlet of the gas from the tank and in a position corresponding to the pressure-reducer device;

first and second sensor means for detecting pressure, temperature and mass consumption of the gas, set respectively downstream of the pressure-reducer device, i.e., in the low-pressure part of the system, and upstream of the pressure-reducer device, i.e., in the high-pressure part of the system; and electronic control means for controlling the delivery devices according to a plurality of signals sent thereto, which indicate the conditions of operation of the system, wherein said electronic control means are set for receiving the signals from said first and second sensor means and are programmed for:

processing the data regarding the low-pressure part of the system, which come from said first sensor means, according to a predetermined algorithm, immediately after each command for cessation of gas delivery, in order to enable timely detection of incorrect functioning of said second valve or a possible gas leak from the low-pressure part of the system; and processing the data regarding the high-pressure part of the system, which come from said second sensor means, according to a predetermined algorithm, during operation of the system, in order to enable timely detection of incorrect functioning of said first pressure part of the system, wherein the aforesaid electronic control means are programmed for carrying out a check on the high-pressure part of the system in a first step, when the condition of minimum delivery is reached for the first time immediately after filling of the gas tank, in order to enable detection of any possible gas leaks, and in a second step, upon the first reactivation of the system after filling of the gas tank, in order to enable' detection of any possible malfunctioning of the first solenoid valve.

5. The system according to claim 4, wherein, in said first step, the aforesaid electronic control means are programmed for executing the following operations:

1. System delivering a pre-set amount.
2. Carry out the operations listed below only if $p_{HP} > p_{thr}$.
3. At the initial instant, close all solenoid valves on the gas cylinders (instant 0).
4. Measure pressure p on HP part ($p_{HP\ 0}$).
5. At each instant X calculate the $\Delta p_{theor}$ that should be found in the time interval $t_{x-t0}$ in the absence of leakages, considering the effective consumption in said interval.
6. Repeat step 4 until $\Delta p_{theor} \geq \Delta p_{thr}$.
7. Measure pressure ($p_{HP}$) again.
8. Calculate pressure difference $\Delta p = p_{HP\ 0} - p_{HP}$.
9. Calculate the ratio S between $\Delta p_{theor}$ and $\Delta p$.
10. If S is lower than a threshold $V_x$, then signal a leak in the circuit; if S is higher than another threshold value $W_x$, then signal that one of the solenoid valves integrated in the gas cylinders is not closing properly.

6. The system according to claim 4, wherein, in said second step, the aforesaid electronic control means are programmed for executing the following operations:

1. System supplying a pre-set amount.
2. Carry out the operations listed below only if $p_{HP} > p_{thr}$.
3. At the initial instant, close all solenoid valves on the gas cylinders (instant 0).
4. Measure pressure p on HP part ($p_{HP\ 0}$).
5. At each instant X calculate the $\Delta p_{theor}$ that should be found in the time interval $t_x - t_0$ in the absence of leakages, considering the effective consumption in said interval.
6. Repeat step 4 until $\Delta p_{theor} \geq \Delta p_{thr}$.
7. Measure pressure ($p_{HP}$) again.
8. Calculate pressure difference Ap=PHP 0−PHP.
9. Calculate the ratio S between $\Delta p_{theor}$ and $\Delta p$.
10. If S is lower than a threshold $V_x$, then signal a leak in the circuit; if S is higher than another threshold value $W_x$, then signal that one of the solenoid valves integrated in the gas cylinders is not closing properly.

* * * * *